United States Patent [19]

Trutna, Jr. et al.

[11] Patent Number: 5,000,568

[45] Date of Patent: Mar. 19, 1991

[54] SPREAD SPECTRUM OPTICAL TIME DOMAIN REFLECTOMETER

[75] Inventors: William R. Trutna, Jr., Atherton; Moshe Nazarathy, Mountain View; Steven A. Newton, Belmont; Scott H. Foster, La Honda, all of Calif.

[73] Assignee: Hewlett-Packard Company, Palo Alto, Calif.

[21] Appl. No.: 415,438

[22] Filed: Sep. 28, 1989

Related U.S. Application Data

[63] Continuation of Ser. No. 307,139, Feb. 6, 1989, abandoned, which is a continuation of Ser. No. 935,661, Nov. 26, 1986, abandoned.

[51] Int. Cl.$^5$ ............................................. G01N 21/88
[52] U.S. Cl. ............................. 356/73.1; 250/227.15; 324/534
[58] Field of Search .................. 356/73.1; 324/51, 52; 250/227

[56] References Cited

U.S. PATENT DOCUMENTS 4,743,753  5/1988  Cheng et al. ........................ 356/73.1

FOREIGN PATENT DOCUMENTS

0060337  4/1984  Japan ................................. 356/73.1

Primary Examiner—Samuel Turner

[57] ABSTRACT

An optical time domain reflectometer that injects at least two complementary code sequences into an optical fiber and detects the return signal produced by each of these code sequences. These return signals are processed to extract the function $h_k$ that is equal to the response function for the fiber when a single pulse is injected into the fiber. This processing utilizes a correlation scheme that has no sidelobe distortion. Various combinations of Golay codes are suitable for use as the complementary codes.

4 Claims, 5 Drawing Sheets

SPREAD SPECTRUM OPTICAL TIME DOMAIN REFLECTOMETER

CROSS REFERENCE TO RELATED APPLICATION

This application is a continuation of application Ser. No. 07,139, filed 02/06/89, now abandoned, which is a continuation of application Ser. No. 935,661, filed 11/26/86, now abandoned.

This invention relates in general to optical time domain reflectometry (OTDR) and relates more particularly to OTDRs utilizing pseudorandom codes. OTDRs are used to measure faults and losses in optical fibers. As an optical pulse travels down an optical fiber, the pulse decreases in amplitude because of Rayleigh scattering that introduces an exponential decay of the pulse with distance travelled along the fiber and because of losses at discontinuities, such as splices. The loss at a splice can result from misalignment of the fibers joined at the splice or by differences in their diameters.

Figures 1, 3A, 3B, 3C, 3D, 4A, 4B:
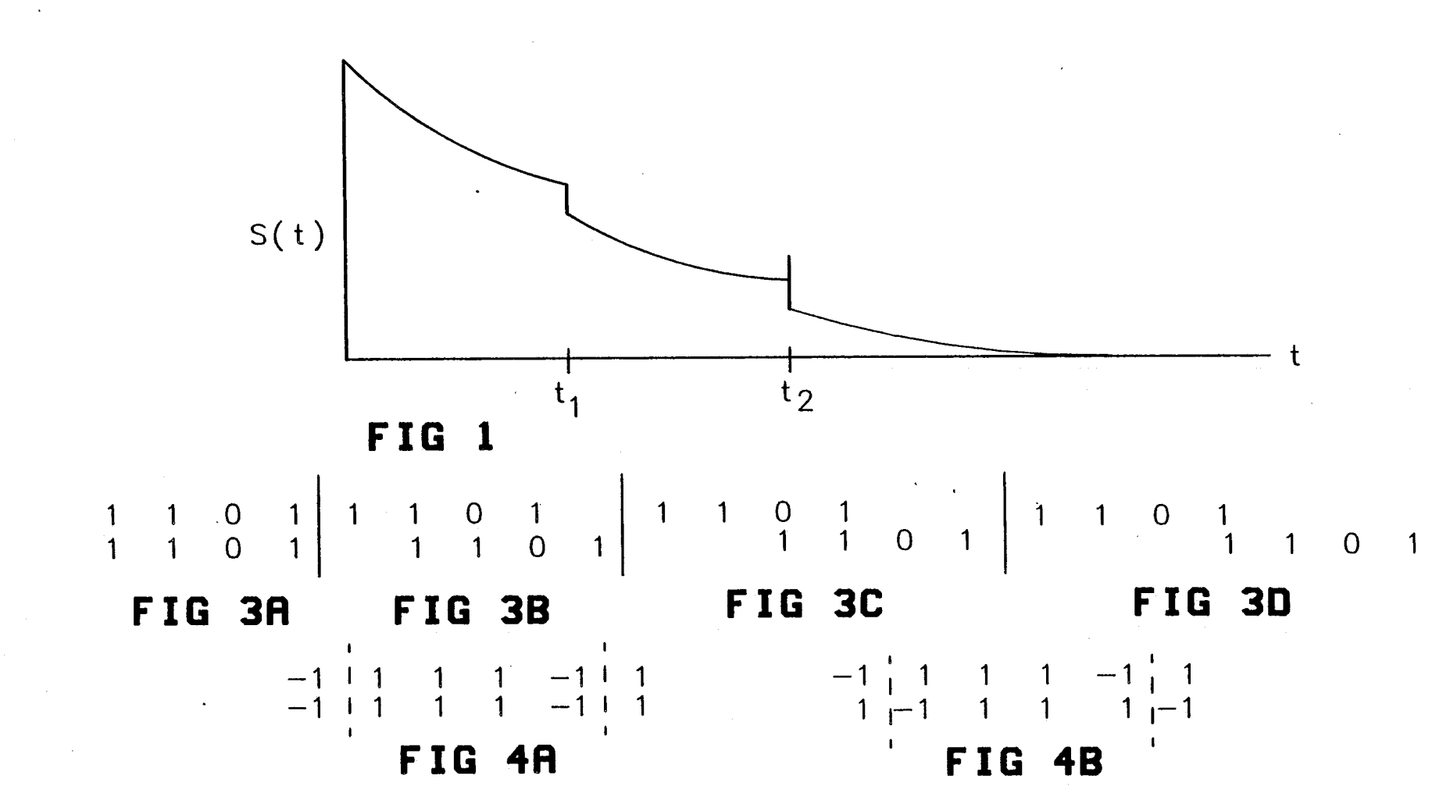
In FIG. 1 is shown the amplitude S(t) of the light scattered back to the input end of an optical fiber when a delta function pulse is launched into the input end of the fiber In FIG. 2 is shown a block diagram of an OTDR.
In FIGS. 3A–3D are illustrated the correlation of finite complementary code with time shifted copies of that code.
In FIGS. 4A–4D are illustrated the correlation products of an infinite periodic complementary code with time shifted copies of that code.

Some of the light scattered by Rayleigh scattering travels back to the input end of the fiber so that these losses can be measured by injecting a light pulse into the fiber and then measuring the return signal as a function of time. Because the amount of light scattered back to the input end of the fiber is small, this return signal is small. As a result of this, this test technique is sensitive to the signal to noise ratio. In FIG. 1 is presented the amplitude $S(t)$ of the light scattered back to the input end of the fiber as a function of time. In addition to the general exponential decay due to the Rayleigh scattering, $S(t)$ exhibits step decreases at discontinuities where a fraction of the energy in the pulse is lost. In this example, there are discontinuities at $t_1$ and $t_2$. From a knowledge of the speed of transmission of the pulse and the times $t_1$ and $t_2$, the spatial location of the discontinuities can be determined.

Figure 2:
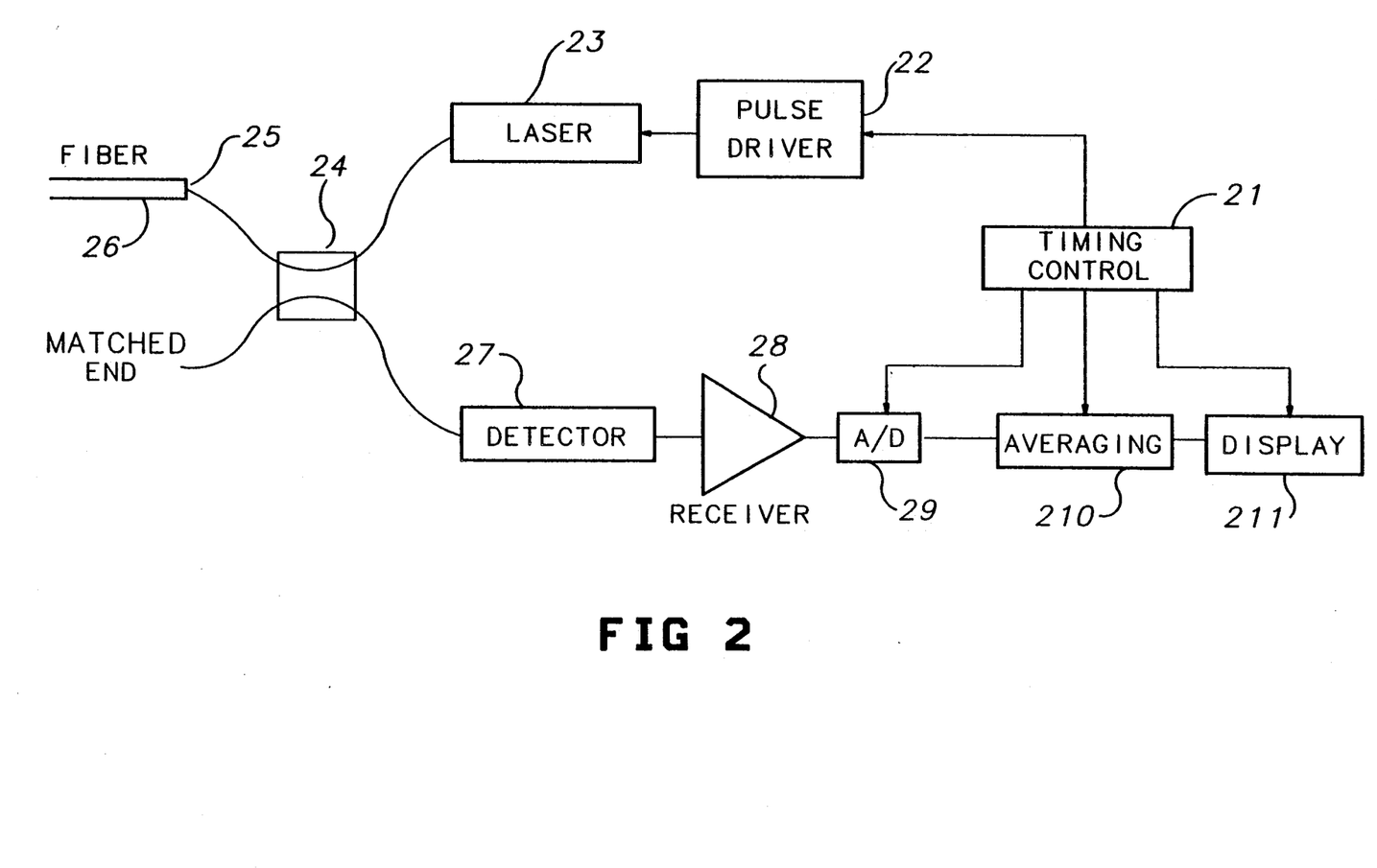

In FIG. 2 is shown an apparatus suitable for measuring $S(t)$. A timing control circuit controls the timing of pulse generation and the timing of measurements of $S(t)$. In response to circuit 21 a pulse driver 22 produces electrical pulses that are applied to a laser 23. In response to these pulses, laser 23 injects light pulses through a coupler 24 to an input end 25 of an optical fiber 26. Scattered light is directed by coupler 24 to a detector 27 which, in response generates electrical signals that are amplified by a receiver 28. These electrical signals are digitized by an analog to digital (A/D) converter 29 for analysis and display. Because the pulses are not true delta function pulses, the measured signal $h(t)$ for a single pulse will be equal to the convolution of $S(t)$ with $p(t)$ (where $p(t)$ is the signal shape for a single pulse).

The backscattered signal is quite weak so that, for long distances into the fiber, $S(t)$ will have a value that is below the noise level of the OTDR. Thus, the range of this test apparatus (i.e., the length of optical fiber that can be tested with this apparatus) is determined by the noise of the system and by the energy of the test pulse. The range can therefore be increased by increasing the amplitude of the pulse, by increasing the length of the pulse, by decreasing the noise of the system and by averaging the return signals.

Increased pulse amplitude requires a more powerful laser, which increases the cost of the system and can make it unsuitable for a portable device, thereby preventing field use of the OTDR. In addition, for portability, it is advantageous that the lasers be semiconductor lasers. Unfortunately, semiconductor lasers are quite limited in power.

Pulse width is also limited by resolution considerations. Increased pulse width smears out the discontinuities in $S(t)$ thereby reducing resolution. Therefore, the desired resolution places a ceiling on the allowed pulse width.

The receiver turns out to be the major source of noise in this apparatus. Thus, the range can be increased by use of a less noisy receiver and by other design factors that reduce noise. However, there are limits to how much such noise can be reduced. In addition, the use of such low noise receivers increases the cost and complexity of the OTDR.

Optical heterodyne detection of the backscattered signal has the potential for reducing receiver noise by over two orders of magnitude (see Amnon Yariv, *Introduction to Optical Electronics*, Holt, Rinehart and Winston, Inc., 1971, pp. 276-279). However, existing laser sources are too broadband and noisy to be used as local oscillator sources to obtain the full advantage of heterodyne detection. The limited coherence time (which is 1/bandwidth) of even the narrowest available laser source limits the usefulness of this approach for long range fault location, since the return signal from a distant source may no longer be coherent with the local oscillator. In general, the coherence length (which is equal to the coherence time times the velocity of propagation in the optical fiber) should be much longer than the twice the length of the fiber (namely, the round trip distance travelled by a test signal in the fiber. For short range measurements, the advantages of this technique can be realized, but with significantly greater cost and complexity relative to a conventional measurement.

In OTDRs utilizing incoherent light (i.e., lasers having a broad enough bandwidth that there is significant modulation of the signal over the optical path of the light beam in the OTDR), only non-negative amplitude modulation can be used to imprint a signal on the carrier. For this reason, the pseudorandom codes discussed below are limited to non-negative signal values.

The range can also be increased by increasing the signal to noise ratio (SNR) of the test apparatus by making multiple measurements and averaging them in an averaging circuit 210 before displaying them with a display device 211 such as a CRT. However, each measurement must be separated in time by an interval T that is sufficient to assure that one measurement does not interfere with a succeeding measurement. As a result of this, such improvement in range carries with it an increase in the measurement time of a fiber.

The interval T is a dead time that is long enough to avoid the return signal produced by one test pulse from interfering with the measurement of another return signal. The period of the test signal plus the period of deadtime following that signal is referred to as a "shot". In order to avoid the increase in measurement time required by making many measurements to increase SNR, some OTDR designs utilize a pseudorandom sequence of pulses to produce a measured signal $x(t)$ that is equal to the sum of the $h(t)$ for each pulse, taking into account the time delays between the pulses in the sequence (see, for example, P. Healey, "Optical Orthogonal Pulse Compression by Hopping", Electronics Letters 17 970-971 (1981); or P. Healey, "Pulse Compression Coding in Optical Time Domain Reflectometry", 7

ECOC, Copenhagen, Denmark, September, 1981). This increase in the number of pulses in a shot increases the amount of energy carried by such a test signal and thereby increases the strength of the return signal, thereby improving the signal to noise ratio.

Mathematically, this overlap means that x(t) is the convolution of h(t) with r(t) where r(t) is:

$$r(t) = \sum_{k=0}^{L-1} r_k p(t - kT_p) \tag{0}$$

where $p(t-kT_p)$ is a test signal having a single pulse of duration Tp starting at time $kT_p$. That is, $$x(t) = (h*r)(t) = \int_{-\infty}^{\infty} h(t-s)r(s)ds \tag{1}$$

By replacing the dummy variable s with the dummy variable $u \equiv t-s$, this can be rewritten as $$x(t) = \int_{-\infty}^{\infty} h(u)r(t-u)du \tag{2}$$

which is a more convenient form for the following discussion.

The desired signal h(t) is extracted from x(t) by a correlation technique. In this technique, x(t) is correlated with r(t) to generate $$y(t) = (r**x)(t) = \int_{-\infty}^{\infty} r(s-t)x(s)ds$$

$$= \int_{-\infty}^{\infty} r(s-t)r(s-u)h(u)dsdu \tag{3}$$

If r(u) can be selected so that $$\int_{-\infty}^{\infty} r(s-t)r(s-u)ds \sim \delta(t-u) \tag{4}$$

(where ~ indicates proportionality) then y(t) will be proportional to h(t).

Pseudorandom sequences only approximately satisfy equation (4). Unfortunately, in addition to the delta function, they have sidelobes that introduce some distortion into the measurement of h(t). The origin of these sidelobes can be understood as follows. The pseudorandom sequences consist of a sequence of pulses that have widths and separations that are integral multiples of the period $T_p$ of a pulse. By representing each pulse as a 1 and the absence of a pulse as a 0, these pseudorandom sequences can be represented as a pseudorandom sequence of 0's and 1's. For such a binary function r(t), equation (4) is equal to a sum over the product of the discrete values of r(t) in each successive clock interval:

$$\sum_{j=-\infty}^{\infty} r_{j-i}r_{j-k} = \delta_{ik} \tag{5}$$

where $\delta_{ik}$ is the Kroneker delta function. In equation (5), i−k represents the relative number of clock periods offset of one copy of r(t) relative to the other copy of r(t) in equation (4).

In FIGS. 3A-3D, these offsets are illustrated for a code containing only three non-zero values. The two copies of $r_i$ in equation 5 are represented in these figures on two successive lines so that the offset of one sequence relative to the other can be graphically illustrated. Equation (5) is the sum of the products of each value in the top line times the value directly below it in the bottom line. For zero offset (FIG. 3A), the sum of the products is equal to 3. For each of the offsets i−k=1, 2, or 3 (FIGS. 3B-3D, respectively), the value is 1, and for all other offsets, the value of equation (5) is zero.

Because of the substantially random pattern of the 0's and 1's, for a nonzero offset, the amplitude of the sidelobes relative to the amplitude of the main lobe will be small. For a pseudorandom sequence in which there are N 1's in a sequence of length L and in which N/L is significantly less than 1, equation (5) will give the value L for i−k=0 and will give a value on the order of 1 or 2 for all other values of i−k. These nonzero values of equation (5) for i−k≠0 are referred to as the "sidelobes" of the autocorrelation. No finite pseudorandom codes are known that have zero autocorrelation sidelobes. Therefore, OTDRs that use pseudorandom codes trade off decreased measurement time for some introduction of distortion. It would be advantageous to have an OTDR that had an equivalent decrease in measurement time without introducing such distortion.

Pseudorandom code techniques are also utilized in microwave radar to increase detection range. Since these radar signals can be heterodyned, the pseudorandom code can be applied as phase modulation so that the code can have negative as well as positive elements. This has the advantage that a negative product of two elements can be used to cancel a positive component of other elements, enabling at least partial cancellation of the sidelobes.

Figure 4C:
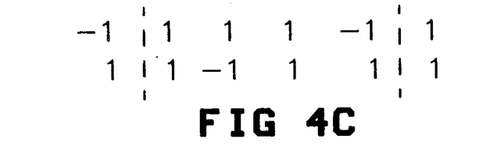
Figure 4D:
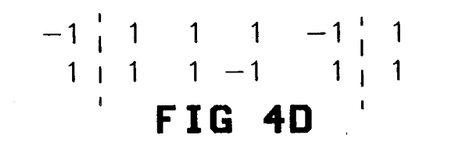

For infinite periodic sequences this sidelobe cancellation can be complete over one period of the sequence if cyclic autocorrelation is used. This is illustrated in FIG. 4 for a case in which the sequence has period four. One period is represented between the dashed lines in those figures. In FIG. 4A, the cyclic autocorrelation product for the elements between the two dashed lines is equal to 4, but in FIGS. 4B-4D, the autocorrelation product for these elements is 0. Thus, the only nonzero products are for i−k equal to some integral multiple of the period 4 of this sequence. There exist periodic sequences such that all sidelobes can be eliminated over one period. These sequences are continuous in the sense that they contain no large segments over which they are zero.

Unfortunately, the magnitude of the return signal from such an infinite continuous sequence will generally exceed the dynamic range of the OTDR. This occurs because the return signals for all of the pulses of the infinite test pulse overlap to produce a total return signal that is much larger than that for a single test pulse. Exceeding the range can be avoided by reducing the amplitude of each pulse. However, this would significantly reduce the signal to noise ratio, defeating the purpose of using pseudorandom codes. Since the main source of noise is the detector, the noise power is proportional to the number of pulses. A much better SNR would therefore be achieved by keeping the amplitude of each pulse at the maximum that can be produced by the pulse source and by reducing the number of pulses in a shot to reduce the amplitude of the return signal to a level that does not exceed the range of the OTDR.

SUMMARY OF THE INVENTION

In accordance with the illustrated preferred embodiments of the OTDR presented herein, the OTDR transmits one or more pairs of complementary pulse sequences that enable an optical fiber measurement time to be decreased without introducing distortion into the measurements of the return signal. The effects of closely spacing test pulses in this manner can be understood by reference to FIGS. 5 and 6.

Figure 5:
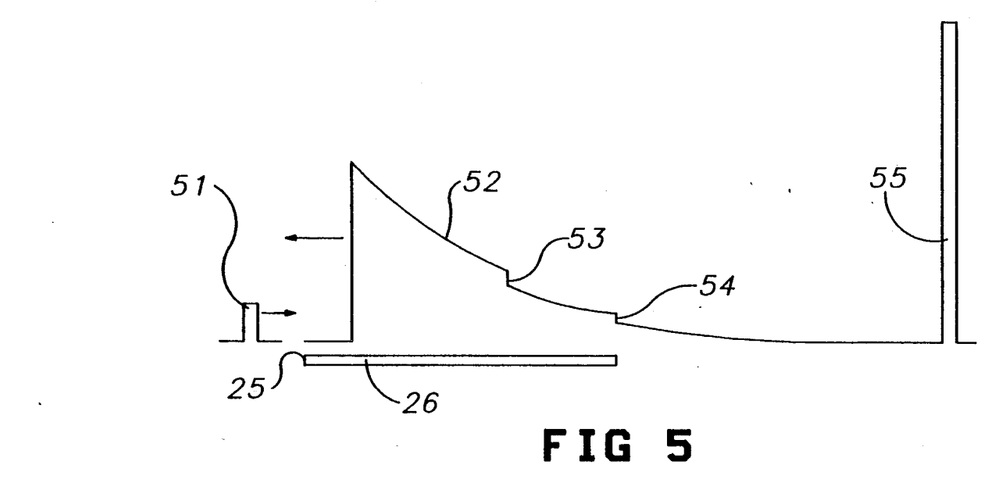
In FIG. 5 is illustrated a representative return signal $x(t)$ produce by a single pulse injected into an optical fiber.

In FIG. 5, a pulse of light 51 is injected into an input end 25 of an optical fiber 26. As this pulse travels down the optical fiber, it produces at end 25 a return signal $x(t)$ due to Rayleigh scattering in the fiber. This return signal $x(t)$ at end 25 has the general shape shown by curve 52. This return signal exhibits a generally exponential decay produced by Rayleigh scattering and exhibits some step drops in amplitude (at points 53 and 54) produced by discrete loss points such as fiber splices.

Depending on how the other end of the fiber is terminated, pulse 51 will typically reflect at least partially at that end and produce a pulse 55 in return signal 52. The duration D of return signal 52 is $2L_{fiber}/v$ where $L_{fiber}$ is the length of fiber 26 and $v$ is the propagation velocity of return signal 52 in fiber 26. Return signal 52 has the same shape as $h(t)$ (discussed in the Background of the Invention), where $h(t)$ is equal to the convolution of pulse 51 with the amplitude $S(t)$ of light scattered back to end 25 for a delta function pulse 51.

Figure 6:
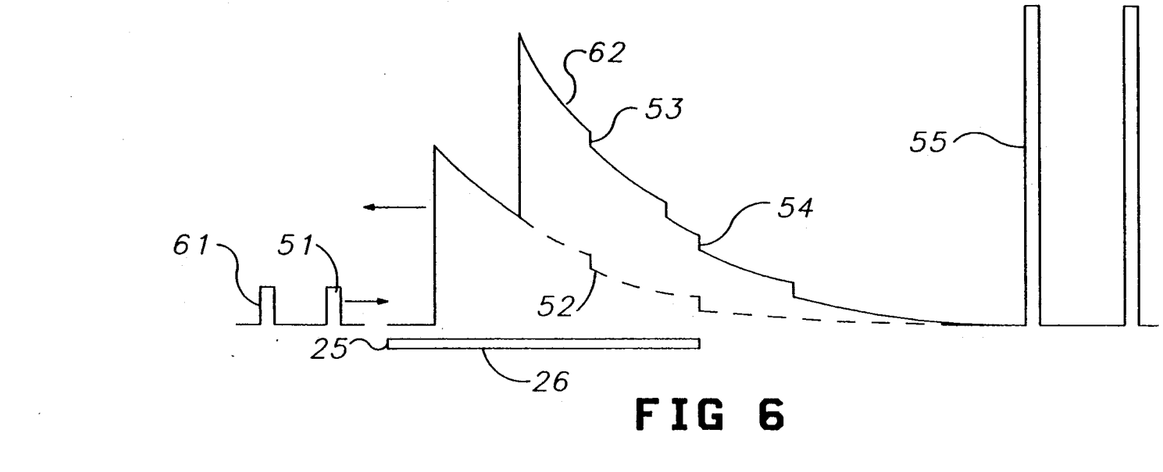
In FIG. 6 is illustrated the effect on the return signal of closely spacing input test pulses.

In most existing OTDRs, the spacing between laser pulses is greater than D so that measurement of the return signal produced by one pulse does not overlap with the return signal for a subsequent pulse. When a pair of pulses, such as pulses 51 and 61 in FIG. 6, are more closely spaced than this, the return signal $x(t)$ is the superposition of a pair of return signals produced by pulses 51 and 61, respectively. This superposition is shown as return signal 62. When a sequence of pulses are closely spaced like this, the resulting return signal is the superposition of the resulting return signals for each of them.

Two important effects of this superposition of signals are: that the measured signal needs to be processed to extract $h(t)$; and that the amplitude of the return signal will be significantly larger than for a single pulse. In order to extract $h(t)$ from the complicated return signal $x(t)$ at end 25, the test pulses are injected into fiber 26 as a set of pulse sequences $r^m(t)$ ($m=1, \ldots$ m for some integer greater than 1), each of which produces an associated return signal $xm(t)$ that does not overlap with any other return signal. Each return signal is measured and the resulting data is processed to extract $h(t)$. The samples of the mth return signal are given by a discrete convolution between the fiber impulse response and the mth injected test signal:

$$x_k^m = \sum_{l=-\infty}^{\infty} r_{l-k}^m h_l. \tag{6}$$

Each pulse sequence $r^m(t)$ has an associated correlation function $c^m(t)$ with which it is correlated to extract $h(t)$ from the measured return signals. The $r^m(t)$ and $c^m(t)$ are selected to satisfy the correlation relationship:

$$\sum_{m=1}^{M} (c^{m**}r^m)(t-u) \equiv \tag{7}$$

$$\sum_{m=1}^{M} \int_{-\infty}^{\infty} c^m(s-t)r^m(s-u)ds \sim \delta(t-u)$$

The set of $c^m_k$ and $r^m_k$ are referred to as complementary codes because the sum of the correlations of the test codes $r^m_k$ with the associated correlation function $c^m_k$ for each test code is proportional to the delta function. Thus, these complementary codes enable extraction of the single pulse return function $h(t)$ without distortion due to correlation sidelobes. In general, the $r^m(t)$ will be discrete signals and the measured signals $x^m(t)$ will be digitized so that the integral in equation (6) can be rewritten as the summation:

$$\sum_{m=1}^{M} (c^{m**}r^m)_{i-k} = \sum_{m=1}^{M} \sum_{j=-\infty}^{\infty} c_{j-i}^m r_{j-k}^m \sim \delta_{ik} \tag{8}$$

where $\delta_{ik}$ is the Kroneker delta function. It should be noted that this equation does not have the sidelobes that are characteristic of previous pseudorandom code techniques for OTDRs. This enables $h(t)$ to be extracted without any sidelobe distortion. As a result of this relation, $h_i$ is extracted as:

$$h_i \sim \sum_{m=1}^{M} (c^{m**}x^m)_i = \sum_{m=1}^{M} \sum_{j=-\infty}^{\infty} c_{j-i}^m x_j^m \tag{9}$$

where $h_i$ are the digitized values of $h(t)$ and $x^m_j$ are the digitized values of $x^m(t)$.

In one particular embodiment, Golay code pair $G^1_i$, $G^2_i$ is utilized to generate the $r^m_i$ and the $c^m_i$ for m=1, 2. In this Golay code pair, each element $G^m_i$ is equal to +1 or -1 for i=1, ..., L and is zero otherwise. These Golay pairs are defined by the property that:

$$\sum_{j=-\infty}^{\infty} [G_{j-i}^1 G_{j-k}^1 + G_{j-i}^2 G_{j-k}^2] = 2L\delta_{ik}, \tag{10}$$

where L is the number of elements in the Golay code. That is, the sum of the autocorrelations of the Golay pair members is proportional to a delta function.

Although the Golay codes can be applied as phase modulation of a carrier signal in some frequency ranges, in the optical frequency ranges used in OTDRs, at present it is preferred to use amplitude modulation. This requires that the applied code be non-negative. Since the Golay codes have negative elements, it is necessary to utilize these codes to generate complementary codes that are non-negative and that fully utilize the properties expressed in equation (10).

In a first preferred embodiment, four complementary test codes, each of length L, are produced from the Golay pair $\{G^1_i, G^2_i\}$. The first two test codes $r^1_i$ and $r^2_i$ are equal to a boxcar sequence $b^L_i$ (which is equal 1 for i=1, ..., L and is zero otherwise) $\pm G^1_i$, respectively, and the other two $r^3_i$ and $r^4_i$ are equal to $b^L_i \pm G^2_i$, respectively. Each $r^m_i$ generates an associated return signal $x^m_i$ that is measured and then processed to extract $h_i$ using relationship (9). The correlation sequences $C^m_i$ are given by $C^1_i = G^1_i$, $C^2_i = -G^1_i$, $C^3_i = G^2_i$ and $C^4_i = -G^2_i$.

In a second embodiment, three test codes are produced from a Golay pair. The first two are each the sum of the boxcar sequence with one of the Golay pair codes and the third is just the boxcar sequence. In the last two embodiments, the processing of the signals amounts to removing the boxcar sequence components from the non-negative complementary test codes by subtraction of the appropriate return signals. This is equivalent to the transmission of complementary test codes with values $+1, -1$ as necessary for utilization of relationship (9).

This particular choice of complementary codes enables many test pulses to be packed together in a single sequence. Each such sequence together with a dead time following the sequence will be referred to herein as a "shot". The length of the dead time is the duration D for a pulse to make a round trip from input end 25 of fiber 26 to the other end of the fiber and back to input end 25. This choice prevents the return signal $x^m(t)$ from overlapping with the subsequent return signal $x^{m+1}(t)$. This enables each $x^m(t)$ to be processed without interference from another return signal. The duty cycle for such a shot is thus $L/(L+d)$ where d is the number of clock cycles contained in the duration D. This significant increase over the duty cycle $1/(1+d)$ for existing single pulse per shot OTDRs results in SNR improvement.

As illustrated in FIG. 6, multiple closely spaced input pulses in the test signal produce overlapping signals in the return signal $x(t)$. One effect of this is that the maximum amplitude of the return signal will be increased. Because of the limited range of the detection and measurement circuitry used to measure the return signal, L should not be chosen so large that the dynamic range of any of this circuitry is exceeded. Typically, this has limited the duty cycle to about 10%. This also has the advantage of providing sufficient time for the source of light pulses to cool in the dead time at the end of each shot.

Actually, the operating range of some of the circuitry can be exceeded during a portion of the period of a response signal as long as that portion is not of interest. Since the return signals are decreasing functions of time, if there is an excessively large portion of the return signal, then it will be toward the beginning of the return signal. This portion of the signal carries information about the fiber close to the input end of the fiber. Therefore, if the portion of the fiber to be tested lies in a window located away from the input end of the fiber, then a larger value of L can be used than if the window were closer to the input end of the fiber.

Actually, the operating range of the OTDR can be exceeded during part of the period of a response signal as long as the portion of the return signal that is of interest does not have such an excess amplitude. Because the return signal $h(t)$ for a single pulse has a generally exponentially decreasing amplitude, this excess amplitude of the measured return signal $x(t)$ will generally occur near its beginning. Since this portion of $x(t)$ carries the information about the portion of the optical fiber near the input end of the optical fiber, as long as the window of interest is deeper into the optical fiber than where the amplitude of $x(t)$ exceeds the OTDR range, such excess amplitude will not interfere with the measurement in the window of interest.

This increase in duty cycle can be utilized to reduce test time (for a given range) or to increase range (for a given test time). In general, the noise increases as the square root of the number of pulses and the signal increases linearly with the number of test pulses. If the results of N shots are averaged, each having L pulses, then the signal to noise ratio (SNR) is improved by a factor of the square root of NL over the SNR for a single shot containing a single pulse. Thus, this produces an increased SNR factor by the square root of L with respect to a single pulse OTDR which uses the same number of averages. Alternatively for the same SNR, the number of averages N can be reduced by a factor 1/L. Equivalently, this means that testing will be substantially L times faster for a given range.

DESCRIPTION OF THE PREFERRED EMBODIMENT

Figure 7:
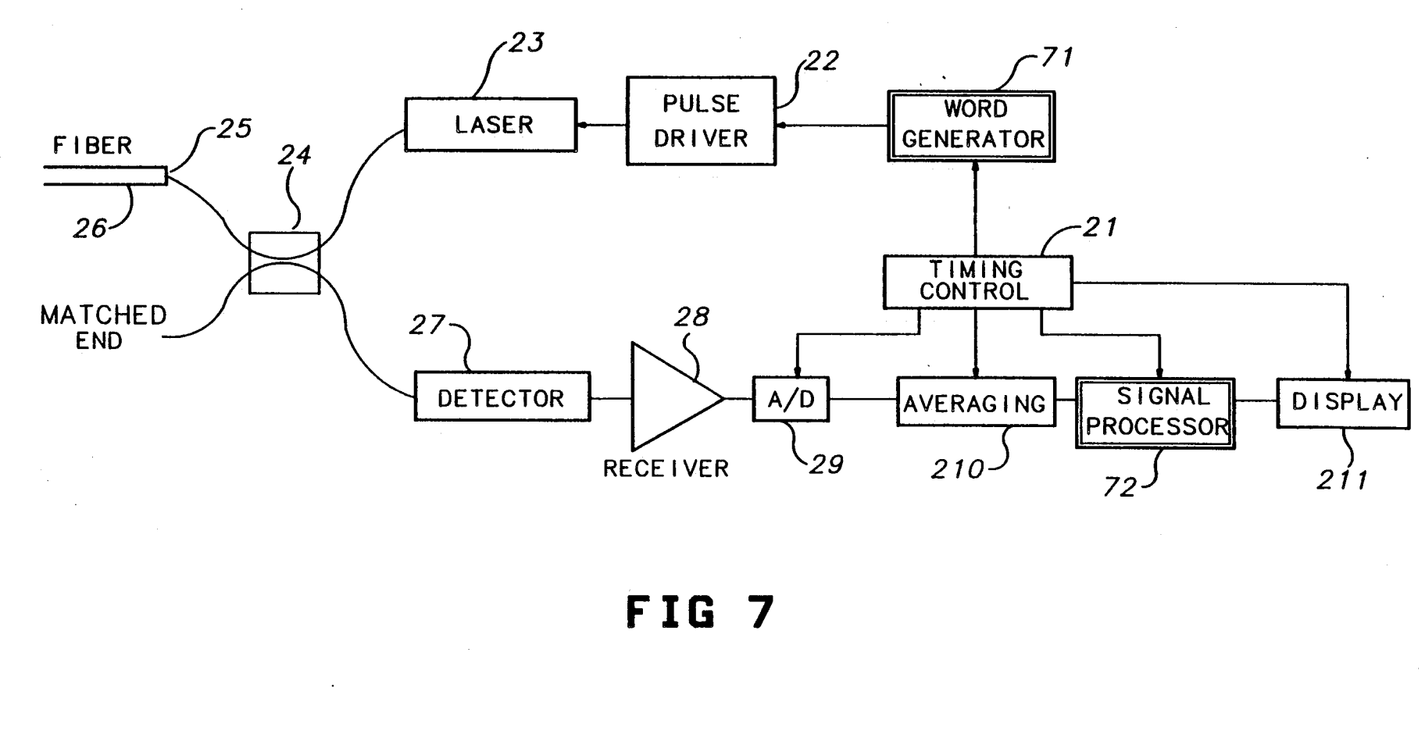
In FIG. 7 is a block diagram of the OTDR.

In FIG. 7 is a block diagram of the OTDR. A timing control circuit 21 provides timing signals to a word generator 71, an A/D converter 29, an averaging circuit 210, a signal processor 72 and a display circuit 211. In response to a signal from timing control circuit 21, word generator provides a complementary test code to a pulse driver 22 which encodes the test code in a sequence of electrical pulses transmitted to a source of light pulses such as laser 23. In response to these electrical pulses, the laser injects an equivalent sequence of pulses through a wavebridge, such as 3 dB coupler 24, to an input end 25 of an optical fiber 26.

Each of these sequences plus a dead time following each sequence is referred to herein as a "shot". Each shot produces a return signal in the optical fiber that is passed through 3 dB coupler 24 to a detector 27 A receiver 28 amplifies the output of detector 27 for input t an A/D converter 29. The A/D converter is connected to an averaging circuit 210 that includes a separate memory or portion of memory for each distinct type of return signal $x^m(t)$ that is to be detected. Successive repetitions of each return signal $x^m(t)$ are added or subtracted as digital data to its associated memory or portion of memory to average these repetitions in order to reduce the signal to noise ratio (SNR) of the test results. The subtraction of shots in the digital memory is done for those shots that consist of the boxcar sequence minus a $(+1, -1)$ valued Golay code. This results in the cancelling of box-car sequences and the reinforcement of Golay codes.

These averaged results for each of the $x^m(t)$ are provided to a signal processor 72 that extracts the return signal h(t) that is produced for a single pulse. h(t) is then displayed on an output display device 211 such as a CRT or a plotter. The particular embodiments of the word generator, the averager and the signal processor will depend on the particular test sequences that are injected into fiber 26.

Figure 8:
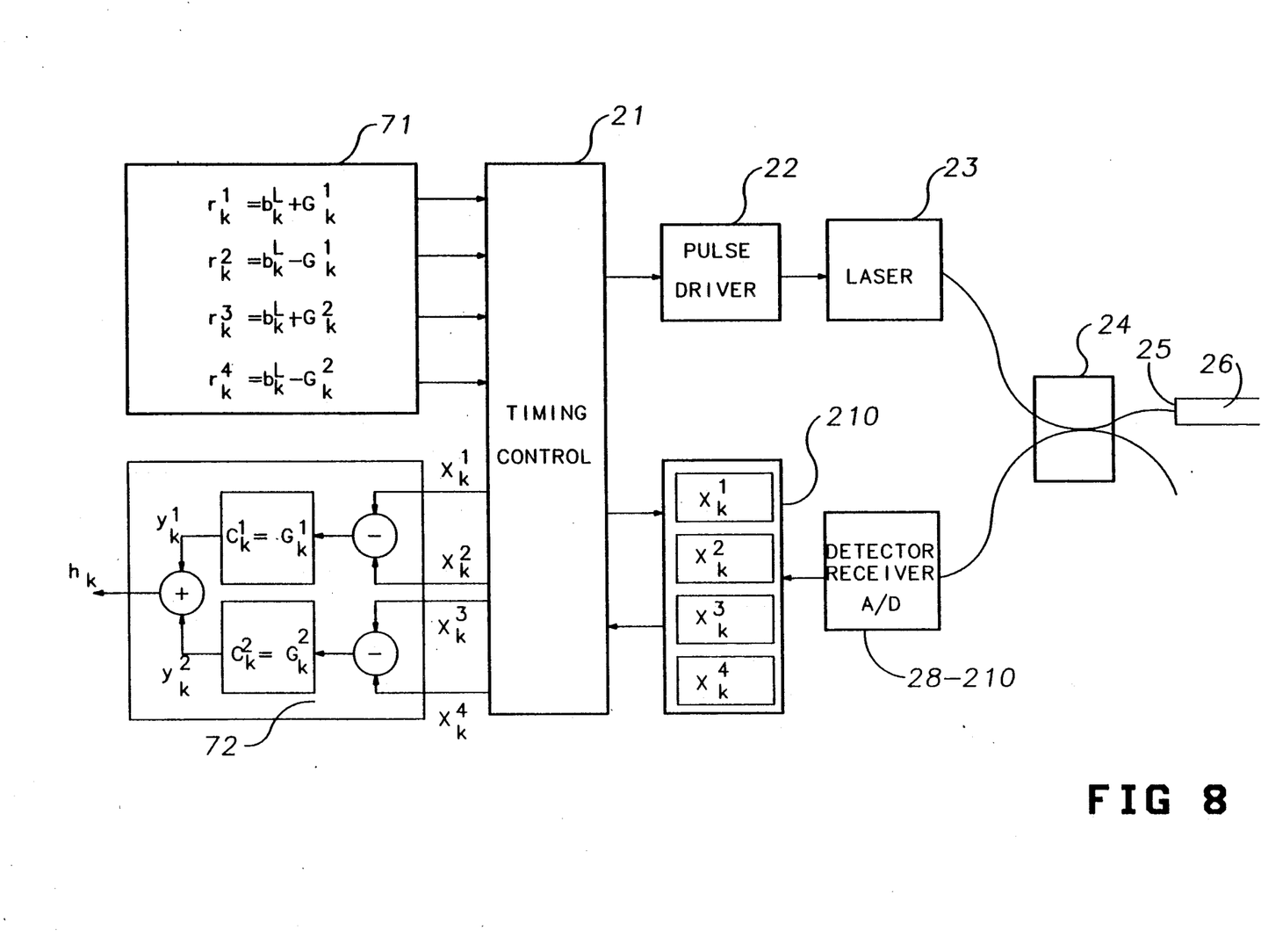
In FIG. 8 is a block diagram of a OTDR for an embodiment that utilizes four complementary code sequences $r^m{}_k$, fabricated using one Golay pair.

In a first embodiment, shown in FIG. 8, the word generator selectively produces any of four outputs: (1) $r^1_k = b^L_k + G^1_k$; (2) $r^2_k = b^L_k - G^1_k$; (3) $r^3_k = b^L_k + G^2_k$; or (4) $r^4_k = b^L_k - G^2_k$ where $b^L_k$ is a boxcar sequence of length L (i.e., a sequence that is 1 for $k = 1, \ldots, L$ and is 0 otherwise), $G^1_k$ is a first Golay code sequence and $G^2_k$ is a second Golay code sequence. These two Golay code sequences form a Golay pair that satisfies the relationship:

$$\sum_{j=-\infty}^{\infty} [G^m_{j-i} G^m_{j-k} + G^{m+1}_{j-i} G^{m+1}_{j-k}] = 2L\delta_{ik} \quad (10)$$

for $m = 1$. Relationship (10) defines a Golay pair.

Timing control circuit 21 selects which of the $r^m_k$ are applied at a given time to pulse driver 22. In response to injecting $r^m_k$ into fiber 26, a return signal $x^m_k$ is detected, amplified, digitized and passed by the timing circuit to signal averaging circuit 210 in which each $x^m_k$ is added into or subtracted from a separate memory location to average these return signals for different shots having the same test sequence $r^m_k$. In processor 72, the incoming $x^1_k$ shots are added and the $x^2_k$ are subtracted. This amounts to the average of the $x^2_k$ being subtracted from the average of the $x^1_k$ and the average of the $x^4_k$ being subtracted from the average of the $x^3_k$. This removes the responses due to the boxcar signals so that the signals processed are as if the boxcar sequences were not added to the input signals to the optical fiber. The averaged difference signal $x^1_k - x^2_k$ is correlated with the correlation sequence $C^1_k = G^1_k$:

$$y^1_k = \sum_{l=-\infty}^{\infty} G^1_{k+l}[x^1_l - x^2_l] \quad (11)$$

and the difference signal $x^3_k - x^4_k$ is correlated with the correlation sequence $C^2_k = G^2_k$:

$$y^2_k = \sum_{l=-\infty}^{\infty} G^2_{k+l}[x^3_l - x^4_l] \quad (12)$$

The results are then added produce the output:

$$h_k \sim y^1_k + y^2_k \quad (13)$$

of the processor. This output represents the response signal of the optical fiber when a single pulse is injected into the optical fiber. By averaging the $x^m_k$ before inputting to the processor, the correlation with the Golay codes need be performed only once for a set of shots. The signal gain factor is of the order of NL where N is the number of averages and L is the code length.

In another embodiment, two pairs of Golay codes $\{G^1_k, G^2_k\}$ and $\{G^3_k, G^4_k\}$ are utilized to produce test sequences. The complementary codes $r^m_k$ in this embodiment are $r^m_k = b^L_k + G^m_k$ for $m = 1, \ldots, 4$. The correlation codes are $C^1_k = G^1_k - G^2_k$ and $C^2_k = G^3_k - G^4_k$. Again, taking the differences between $x^m_k$ removes the responses to the boxcar sequences. The resulting output $O_k$ from processor 72 is:

$$O_k = 4Lh_k - \sum_{l,p=-\infty}^{\infty} [G^1_{l-k} G^2_{l-p} + G^3_{l-k} G^4_{l-p}] h_p - \quad (14)$$

$$\sum_{l,p=-\infty}^{\infty} [G^2_{l-k} G^1_{l-p} + G^4_{l-k} G^3_{l-p}] h_p$$

These last two terms are zero when the Golay pairs are chosen to have zero crosscorrelation with each other. The reference by B. B. Lee and E. S. Furgason, "Golay Codes for Simultaneous Operation in Phased Arrays", 1982 Ultrasound Symposium 821-825 teaches how to produce such codes.

In a third embodiment, the complementary codes are: (1) $r^1_k = b^l_k + G^1_k$; (2) $r^2_k = b^L_k$; (3) $r^3_k = b^L_k + G^2_k$; and (4) $r^4_k = b^L_k$ and the correlation sequences are $C^1_k = G^1_k$ and $C^2_k = G^2_k$. Since two of the $r^m_k$ are equal, there are really only three complementary sequences used in this embodiment. Also, because the boxcar sequence does not carry any signal coded information, it need only be transmitted once in a long procession of shots.

Suitable Golay codes are presented in the references R. H. Pettit, "Pulse Sequences with Good Correlation Properties", Microwave Journal 63-67(1967) and M. J. E. Golay "Complementary Series", Proc. IRE 20 82-87 (1961). One particular set of Golay codes that are easy to generate for a length $L = 2^{n-1}$ for some integer n are as follows. A Golay pair of length 1 is the pair of sequences $^1G^1_k = \{1\}$ and $^1G^2_k = \{1\}$. The superscript to the left of G indicates that this is a Golay code for $n = 1$. Higher order values of n are generated by the following iteration:

$$^{n+1}G^1_k = \{^nG^1_k, {}^nG^2_k\} \quad (15)$$

$$^{n+1}G^2_k = \{^nG^1_k, {}^nG^2_k{}^*\} \quad (16)$$

where $^nG^{2*}$ is the conjugate of $^nG^2$. By conjugate is meant that each element in $^nG^{2*}$ is equal to minus the corresponding element in $^nG^2$. For example, for $n = 3$, the sequences are:

$^3G^1_k = \{1,1,1,-1\}$ and $^3G^2_k = \{1,1,-1,1\}$

Three other Golay pairs of length $2^n$ can be produced from this pair by reversing the polarity of all of the elements in: just $^nG^1_k$; just $^nG^1_k$; or in both $^nG^1_k$ and $^nG^2_k$. In the preferred embodiments, the number of complementary sequences is small. These sequences are repeatedly transmitted and equation (9) seems to suggest that a correlation needs to be performed on every shot which is time consuming. However, due to the linearity of the averaging and correlation operations, the order of application of these operations may be reversed, performing averaging of identical shots and applying only one correlation over the averaged result. Notice that the implementation becomes more efficient, the smaller the number of sequences in the complementary set. Also, whenever a particular correlation sequence $C^m$ is the inverse of another one, the return due to that test signal may be subtracted out from the return due to the other test signal during the averaging process, and the averaging performed at the end rather than two correlations. These techniques result in efficient utilization of the measurement time mainly for averaging, with a small proportion of it utilized for correlation.

We claim:

1. Apparatus for testing return signals in an electrical or optical communications medium, the apparatus comprising:

a timing control circuit producing a sequence $\{\phi k\}_k$ of pulse clock signals at successive clock cycles;

a word generator for receiving the sequence of pulse clock signals and for generating and issuing a set of four code sequences $\{r^m_k\}_k$ (m=1,2,3,4), two of which may be identical, for each pulse clock signal k, where the code sequence values $r^m_k$ are all non-negative or all non-positive and are determined by the relationships $$r^1_k = b^L_k + G^1_k,$$

$$r^2_k = b^L_k + G^2_k,$$

$$r^3_k = r^4_k = b^L_k,$$

where the two sequences $\{G^m_k\}_k$ (m=1,2) form a Golay pair of complementary code sequences of length L that satisfy the relation $$\sum_{j=-\infty}^{\infty} (G^1_{j-i} G^1_{j-k} + G^2_{j-i} G^2_{j-k}) = 2L\delta_{ik},$$

where L is an integer greater than one, where $\delta_{ik}$ is the Kronecker delta symbol, and where $\{b^L_k\}$hd k is a sequence having L consecutive terms equal to one or to a fixed non-zero constant value, with all other terms of the sequence being zero, the word generator further generating and issuing two correlation sequences $\{c^m_k\}_k$ (m=1,2,3,4) defined by $$c^1_k = c^3_k = G^1_k,$$

$$c^2_k = c^4_k = G^2_k;$$

injection means for receiving the pulse clock signal sequence $\{\phi_k\}_k$, for receiving a signal sequence $\{r^m_k\}_k$ from the word generator, and for injecting this sequence in successive clock cycles k into the communications medium;

detection means for receiving the pulse clock signal $\{\phi_k\}_k$ and for detecting a return signal sequence $\{x^m_k\}_k$ produced by the communications medium in successive clock cycles k in response to injection of the signal sequence $\{r^m_k\}_k$ for each integer m=1,2,3,4; and processing means for receiving the pulse clock signal sequence $\{\phi_k\}_k$, for receiving the return signal sequence $\{x^m_k\}_k$ in successive clock cycles k, and for forming a linear combination $z_k$ of the four return signal sequences $$z_k = \sum_{j=-\infty}^{\infty} [c^1_{j+k}(x_j^1 - x_j^3) + c^2_{j+k}(x_j^2 - x_j^4)],$$

where the sequence $\{z_k\}_k$ represents the return signal for a pulse input signal injected into the communication medium.

2. Apparatus for testing return signals in an electrical or optical communications medium, the apparatus comprising:

a timing control circuit producing a sequence $\{\phi_k\}_k$ of pulse clock signals at successive clock cycles;

a word generator for receiving the sequence of pulse clock signals and for generating and issuing a set of 2M code sequences $\{r^m_k\}_k$ (m=1,2, ..., 2M) for each pulse clock signal k, where the code sequence values $r^m_k$ are all non-negative or all non-positive and are determined by the relationships $$r^m_k = b^L_k + G^m_k \text{ (m=1,2,3,4)},$$

where the two sequences $\{G^m_k\}_k$ (m=1,2) from a first Golay pair of complementary code sequences of length L that satisfy the relation $$\sum_{j=-\infty}^{\infty} [G^1_{j-i} G^1_{j-k} + G^2_{j-i} G^2_{j-k}] = 2L\delta_{ik},$$

where the two sequences $\{G^m_k\}_k$ (m=3,4) form a second Golay pair of complementary code sequences of length L that satisfy the relation $$\sum_{j=-\infty}^{\infty} [G^3_{j-i} G^3_{j-k} + G^4_{j-i} G^4_{j-k}] = 2L\delta_{ik},$$

where the four Golay code sequences $\{G^m_k\}_k$ (m=1,2,3,4) satisfy the relation $$\sum_{j=-\infty}^{\infty} [G^1_{j-i} G^2_{j-k} + G^3_{j-i} G^4_{j-k} - G^2_{j-i} G^1_{j-k} - G^4_{j-i} G^3_{j-k}] = 0 \text{ (all } i,k\text{)},$$

where L is an integer greater than one, $\delta_{ik}$ is the Kronecker delta symbol, and $\{b^L_k\}_k$ is a sequence having L consecutive terms equal to one or to a fixed non-zero constant value, with all other terms of this sequence being zero, the word generator further generating and issuing for correlation sequences $\{c^m_k\{_k(m,2,3,4)$ defined by $$c^1_k = G^1_k - G^2_k = -c^2_k,$$

$$c^3_k = G^3_k - G^4_k = -c^4_k;$$

injection means for receiving the pulse clock signal sequence $\{\phi_k\}_k$, for receiving a signal sequence $\{r^m_k\}_k$ from the word generator, and for injecting this sequence in successive clock cycles k into the communications medium;

detection means for receiving the pulse clock signal $\{\phi_k\}_k$ and for detecting a return signal sequence $\{x^m_k\}_k$ produced by the communications medium in successive clock cycles k in response to injection of the signal sequence $\{r^m_k\}_k$ for each integer m=1,2,3,4; and processing means for receiving the pulse clock signal sequence $\{\phi_k\}_k$, for receiving the return signal sequence $\{x^m_k\}_k$ in successive clock cycles k, and for forming a linear combination $z_k$ of the four return signal sequences $$z_k = \sum_{m=1}^{4} \sum_{j=-\infty}^{\infty} c^m_{j+k} x_j^m,$$

where the sequence $\{z_k\}_k$ represents the return signal for a pulse input signal injected into the communications medium.

3. Apparatus for testing return signals in an electrical or optical communications medium, the apparatus comprising:

a timing control circuit producing a sequence $\{\phi_k\}_k$ of pulse clock signals;

a word generator for receiving the sequence of pulse clock signals and for generating and issuing a set of four code sequences $\{{}^n r^m{}_k\}_k$ (m=1,2,3,4) for each pulse clock signal k for a fixed integer n≧0, where the code sequence values ${}^n r^m{}_k$ are all non-negative or all non-positive and are determined by the relationships $${}^n r^1{}_k = b^L{}_k + {}^n G^1{}_k,$$

$${}^n r^2{}_k = b^L{}_k - {}^n G^1{}_k,$$

$${}^n r^3{}_k = b^L{}_k + {}^n G^2{}_k,$$

$${}^n r^4{}_k = b^L{}_k - {}^n G^2{}_k,$$

where $L=2^n$ for a positive integer n, where $\{b^L{}_k\}_k$ is a sequence having L consecutive terms equal to one or to a fixed non-zero constant value, with all other values of the sequence being zero, where $\{{}^n G^1{}_k\}_k$ and $\{{}^n G^2{}_k\}_k$ form a Golay pair of complementary code sequences of length L that satisfy the relation $$\sum_{j=-\infty}^{\infty} [{}^n G^1_{j-i} {}^n G^1_{j-k} + {}^n G^2_{j-i} {}^n G^2_{j-k}] = 2L\delta_{ik},$$

where $\delta_{ik}$ is the Kronecker delta, and where the Golay pair of code sequences $\{{}^{n+1} G^1{}_k\}_k$ and $\{{}^{n+1} G^2{}_k\}_k$ for an integer n+1≧1, are generated inductively by the relationships $${}^0 G^1{}_k = \{1\},$$

$${}^0 G^2{}_k = \{1\},$$

$${}^{n+1} G^1{}_k = \{{}^n G^1{}_k, {}^n G^2{}_k\}, (n \geq 0)$$

$${}^{n+1} G^1{}_k = \{{}^n G^1{}_k, -{}^n G^2{}_k\}, (n \geq 0)$$

the word generator further generating and issuing a correlation sequence $\{{}^n c^m{}_k\}_k$ of length $L = 2^n$ corresponding to each sequence $\{{}^n r^m{}_k\}_k$ (m=1,2,3,4) and being defined by $${}^n c^1{}_k = {}^n G^1{}_k = -{}^n c^2{}_k,$$

$${}^n c^3{}_k = {}^n G^2{}_k = -{}^n c^4{}_k;$$

injection means for receiving the pulse clock signal sequence $\{\phi_k\}_k$, for receiving a signal sequence $\{{}^n r^m{}_k\}_k$ from the word generator, and for injecting this sequence in successive clock cycles k into the communications medium;

detection means for receiving the pulse clock signal $\{\phi_k\}_k$ and for detecting a return signal sequence $\{{}^n x^m{}_k\}_k$ produced by the communications medium in successive clock cycles k in response to injection of the signal sequence $\{{}^n r^m{}_k\}_k$ for each integer m=1,2,3,4; and processing means for receiving the pulse clock signal sequence $\{\phi_k\}_k$, for receiving the return signal sequence $\{{}^n x^m{}_k\}_k$ in successive clock cycles k, and for forming a linear combination ${}^n z_k$ of the four return signal sequences defined by $${}^n z_k = \sum_{m=1}^{2M} \sum_{j=-\infty}^{\infty} {}^n c^m_{j+k} {}^n x^m_j,$$

where the sequence $\{{}^n z_k\}_k$ represents the return signal for a pulse input signal injected into the communications medium.

4. Apparatus for testing return signals in an electrical or optical communications medium, the apparatus comprising:

a timing control circuit producing a sequence $\{\phi_k\}_k$ of pulse clock signals;

a word generator for receiving the sequence of pulse clock signals and for generating and issuing a set of four code sequences $\{{}^n r^m{}_k\}_k$ (m=1,2,3,4) for each pulse clock signal k for a fixed integer n≧0, where the code sequence values ${}^n r^m{}_k$ are all non-negative or all non-positive and are determined by the relationships $${}^n r^1{}_k = b^L{}_k + {}^n G^1{}_k,$$

$${}^n r^2{}_k = b^L{}_k - {}^n G^1{}_k,$$

$${}^n r^3{}_k = b^L{}_k + {}^n G^2{}_k,$$

$${}^n r^4{}_k = b^L{}_k - {}^n G^2{}_k,$$

where $L=2^n$ for a positive integer n, where $\{b^L{}_k\}_k$ is a sequence having L consecutive terms equal to one or to a fixed non-zero constant value with all other values of the sequence being zero, where $\{{}^n G^1{}_k\}_k$ and $\{{}^n G^2{}_k\}_k$ form a Golay pair of complementary code sequences of length L that satisfy the relation $$\sum_{j=-\infty}^{\infty} [{}^n G^1_{j-i} {}^n G^1_{j-k} + {}^n G^2_{j-i} {}^n G^2_{j-k}] = 2L\delta_{ik},$$

where $\delta_{ik}$ s the Kronecker delta, and where the Golay pair of code sequences $\{{}^{n+1} G^1{}_k\}_k$ and $\{{}^{n+1} G^2{}_k\}_k$ for an integer n+1≧1, are generated inductively by the relationships $${}^0 G^1{}_k = \{1\},$$

$${}^0 G^2{}_k = \{1\},$$

$${}^{n+1} G^1{}_k = \{{}^n G^1{}_k, {}^n G^2{}_k\}, (n \geq 0)$$

$${}^{n+1} G^1{}_k = \{-{}^n G^1{}_k, {}^n G^2{}_k\}, (n \geq 0)$$

the word generator further generating and issuing a correlation sequence $\{{}^n c^m{}_k\}_k$ of length $L = 2^n$ corresponding to each sequence $\{{}^n r^m{}_k\}_k$ (m=1,2,3,4) and being defined by $${}^n c^1{}_k = {}^n G^1{}_k = -{}^n c^2{}_k,$$

$${}^n c^3{}_k = {}^n G^2{}_k = -{}^n c^4{}_k;$$

injection means for receiving the pulse clock signal sequence $\{\phi_k\}_k$, for receiving a signal sequence $\{{}^n r^m{}_k\}_k$ from the word generator, and for injecting this sequence in successive clock cycles k into the communications medium;

detection means for receiving the pulse clock signal $\{\phi_k\}_k$ and for detecting s return signal sequence $\{{}^n x^m{}_k\}_k$ produced by the communications medium in successive clock cycles k in response to injection of the signal sequence $\{{}^n r^m{}_k\}_k$ for each integer m+1,2,3,4; and processing means for receiving the pulse clock signal sequence $\{\phi_k\}_k$, for receiving the return signal sequence $\{{}^n x^m{}_k\}_k$ in successive clock cycles k, and for forming a linear combination ${}^n z_k$ of the four return signal sequences defined by $$ {}^n z_k = \sum_{m=1}^{2M} \sum_{j=-\infty}^{\infty} {}^n c^m_{j+k} {}^n x^m_j. $$

where the sequence $\{{}^n z_k\}_k$ represents the return signal for a pulse input signal injected into the communications medium.

* * * * *

UNITED STATES PATENT AND TRADEMARK OFFICE
CERTIFICATE OF CORRECTION

PATENT NO. : 5,000,568

DATED : March 19, 1991

INVENTOR(S) : William R. Trutna Jr., et al.

It is certified that error appears in the above-identified patent and that said Letters Patent is hereby corrected as shown below:

Column 1, line 8, "No. 07,139" should read --No. 307,139--; line 42, "21 a pulse" should read --21, a pulse--; line 47, "response generates" should read --response, generates--.

Column 2, line 32, "the twice the" should read --twice the--.

Column 4, line 3, "equation 5" should read --equation (5)--.

Column 5, line 51, "...m for some" should read "...M for some"; line 53, "xm(t)" should read --$x^m(t)$--.

Column 8, line 9, "Alternatively for" should read --Alternatively, for--; line 18, "fiber" should read --fiber.--; line 33, "of a OTDR" should read --of the OTDR--; line 54, "27 A" should read --27. A--; line 56, "t an A/D" should read --to an A/D--.

Column 10, line 17, "(1) $r^1_k = b^L_k + G^1_k$" should read --(1) $r^1_k = b^L_k + G^1_k$--; between lines 35 and 40, equation (16), that portion reading "$^{n+1}G_{2k}$" should read --$^{n+1}G^2_k$--; line 41 "$^nG^{2*}$. is" should read --$^nG^{2*}$ is--; line 52, "just $^nG^1_k$" should read --just $^nG^2_k$--.

Column 11, line 29, that portion reading "$(G^1_{j-l}$" should read --$(G^1_{j-i}$--; line 33, "$\{b^L_k\}$hd k" should read --$\{b^L_k\}_k$--.

Column 12, line 12, "from" should read --form--; line 41, "for" should read --four--; line 42, "$\{c^m_k\{$" should read --$\{c^m_k\}$--.

UNITED STATES PATENT AND TRADEMARK OFFICE
CERTIFICATE OF CORRECTION

PATENT NO. : 5,000,568

DATED : March 19, 1991

INVENTOR(S) : William R. Trutna Jr., et al.

It is certified that error appears in the above-identified patent and that said Letters Patent is hereby corrected as shown below:

Column 14, line 35, "value with" should read --value, with--; line 44, "s the" should read --is the--.

Column 15, line 4, "detecting s return" should read --detecting a return--; line 8, "m+1,2,3,4" should read --m=1,2,34--.

Column 13, line 54, "$=-{}^n c^4 k$" should read --$=-{}^n c^4 k$--.

Signed and Sealed this

Twenty-ninth Day of September, 1992

Attest:

DOUGLAS B. COMER

*Attesting Officer*   *Acting Commissioner of Patents and Trademarks*